Dec. 15, 1931.  G. F. BRYANT  1,836,954
METAL WORKING MACHINE
Filed Nov. 29, 1926   10 Sheets-Sheet 3

Dec. 15, 1931.   G. F. BRYANT   1,836,954
METAL WORKING MACHINE
Filed Nov. 29, 1926    10 Sheets-Sheet 6

Inventor
George F. Bryant,
By Churchill Parker Rockem
Attys.

Dec. 15, 1931.  G. F. BRYANT  1,836,954
METAL WORKING MACHINE
Filed Nov. 29, 1926  10 Sheets-Sheet 7

Fig. 22.
PLAN.

Inventor:
George F. Bryant,
By Churchill Parker Karlson
Attys.

Patented Dec. 15, 1931

1,836,954

UNITED STATES PATENT OFFICE

GEORGE F. BRYANT, OF CHICAGO, ILLINOIS, ASSIGNOR TO MARYE SAFETY NUT CORPORATION, OF CHICAGO, ILLINOIS, A CORPORATION OF ILLINOIS

METAL WORKING MACHINE

Application filed November 29, 1926. Serial No. 151,278.

This invention has particular, although not exclusive, reference to a machine for facing, countersinking and milling the threads of nuts. The object of the invention, generally stated, is to provide a fully automatic machine which shall be capable of producing accurately milled nuts at relatively low cost.

I will proceed to describe the present embodiment of the invention in considerable detail without, however, intending to imply that the invention is limited to the precise details of construction and the particular use described.

The machine is adapted to operate upon nut blanks punched out in the ordinary manner, each blank being hexagonal and having a rough central opening. The operations performed upon the blank, stated in consecutive order, are the drilling or reaming of the bore of the nut, the countersinking of the bore at the contact end of the nut, the facing of the contact end of the nut, and the milling of the thread.

In order that the machine may be capable of a relatively large output, I employ a multiplicity of nut-milling units and arrange said units upon the periphery of a rotatory framework or drum so that the units may be successively carried past a loading station and around to an unloading station, each unit operating to mill a nut while traveling from the loading to the unloading station.

Figure 28:
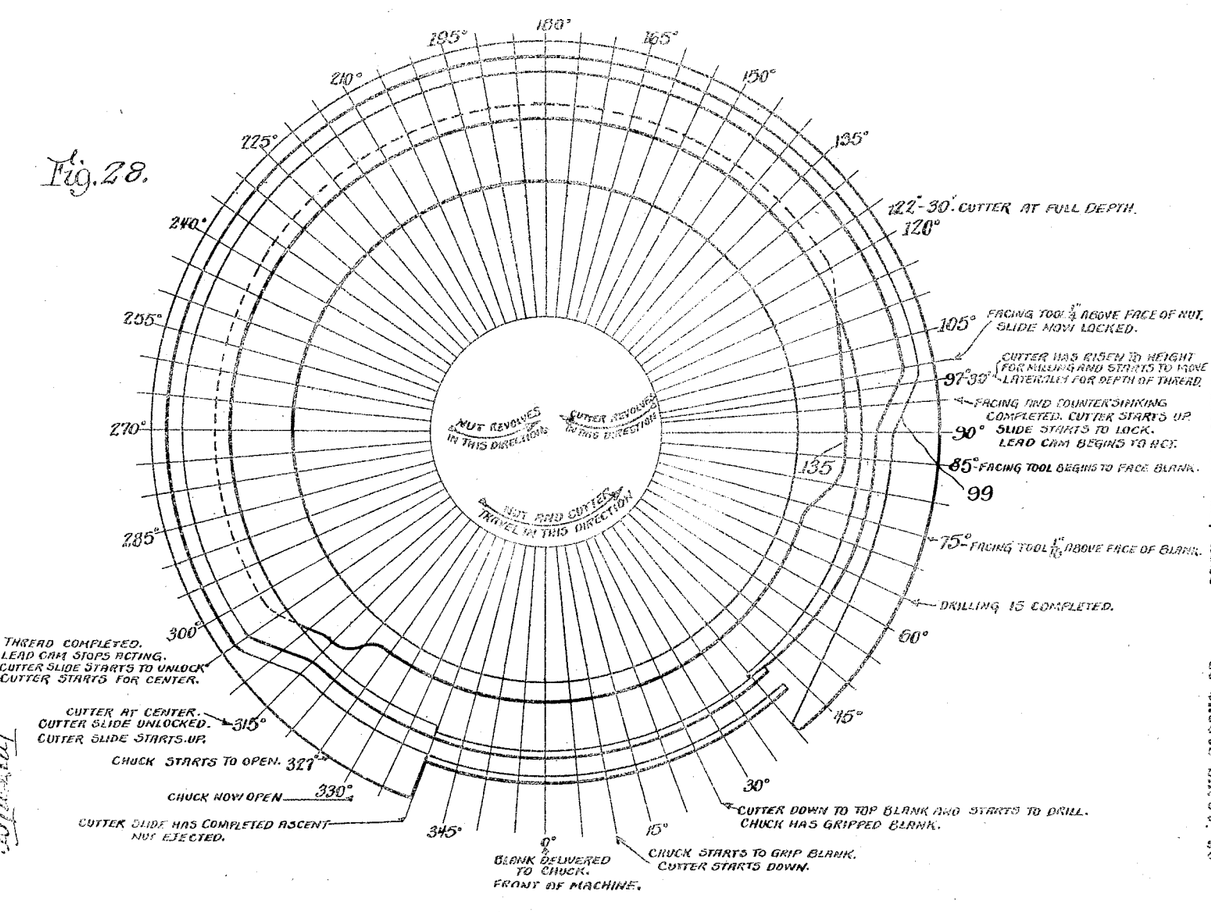
Fig. 28 is a diagrammatic time table of the machine.

Reference may be made to Fig. 28 which is a diagram illustrating the general operation of the machine and the cycle of operations of each milling unit.

The main frame of the machine comprises a base 1 having a circular trough 2 for the coolant, and a central column 3. To the upper end of the column 3 is rigidly secured a circular frame member or drum 4. The milling units are mounted upon the perimeter of a drum 5 which is rotatably mounted upon the column 3.

Figures 1, 2:
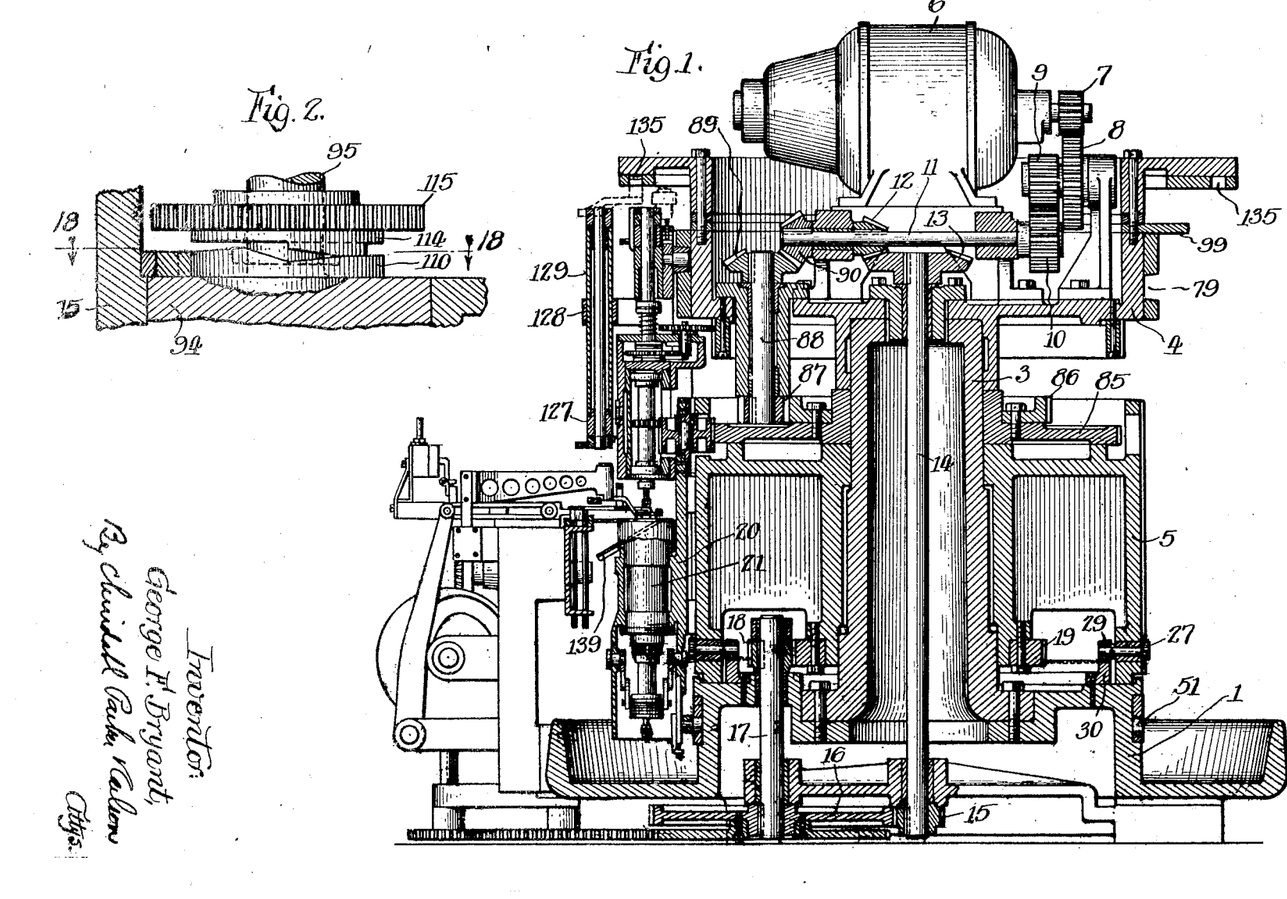
Figure 1 is a vertical sectional view of one form of machine embodying the features of my invention.
Fig. 2 is a fragmental sectional view illustrating the lead cams.

Power to revolve the drum 5, actuate the milling units and drive the loading mechanism may be derived from any suitable source, that herein shown consisting of an electric motor 6 which is supported upon the drum 4, as shown in Fig. 1. A gear train consisting of the elements 7, 8, 9 and 10 communicates power from the armature shaft of the motor to a horizontal shaft 11 supported in bearings on the stationary drum 4.

The means herein shown for continuously revolving the drum 5 which carries the milling units comprises a bevel gear 12 on the shaft 11 which meshes with a bevel gear 13 fixed on the upper end of a central vertical shaft 14. On the lower end of the shaft 14 is fixed a pinion 15 that meshes with a spur gear 16 fixed upon a shaft 17. The pinion 18 on the upper portion of the shaft 17 meshes with a gear ring 19 fixed to the lower portion of the drum 5 and concentric therewith.

Figure 19:
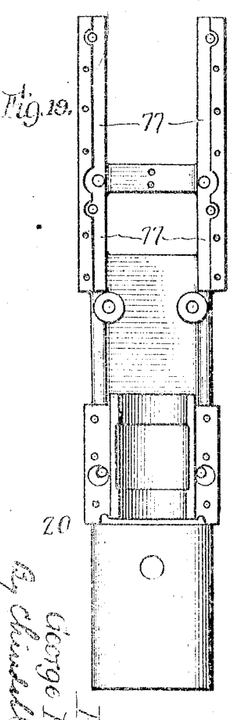
Fig. 19 is a detail front view of the bracket which constitutes the frame of the thread-milling unit.
Figure 20:
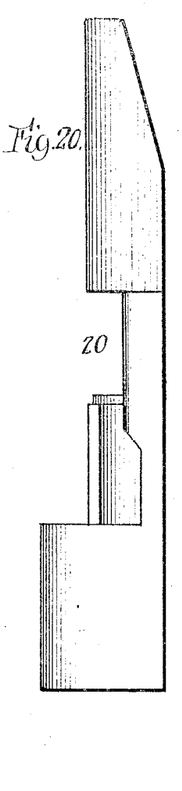
Fig. 20 is a side view of said bracket.
Figure 21:
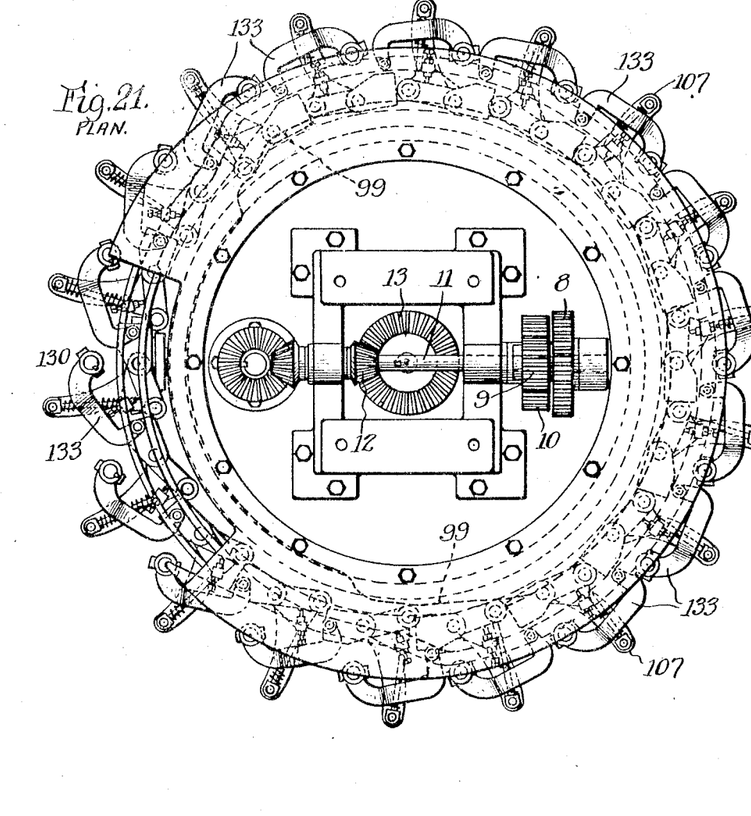
Fig. 21 is a plan view of the machine, the driving motor and the loading mechanism being omitted.

Each nut-milling unit comprises a bracket or frame member 20 (Figs. 19 and 20) which is rigidly secured to the drum 5. A work spindle 21 is rotatably mounted within the lower portion of the bracket 20, a washer 22 (Fig. 9) being interposed between the upper bearing surfaces on the bracket and the work spindle, and a washer 23 being interposed between the lower bearing surfaces on said parts.

Figure 3:
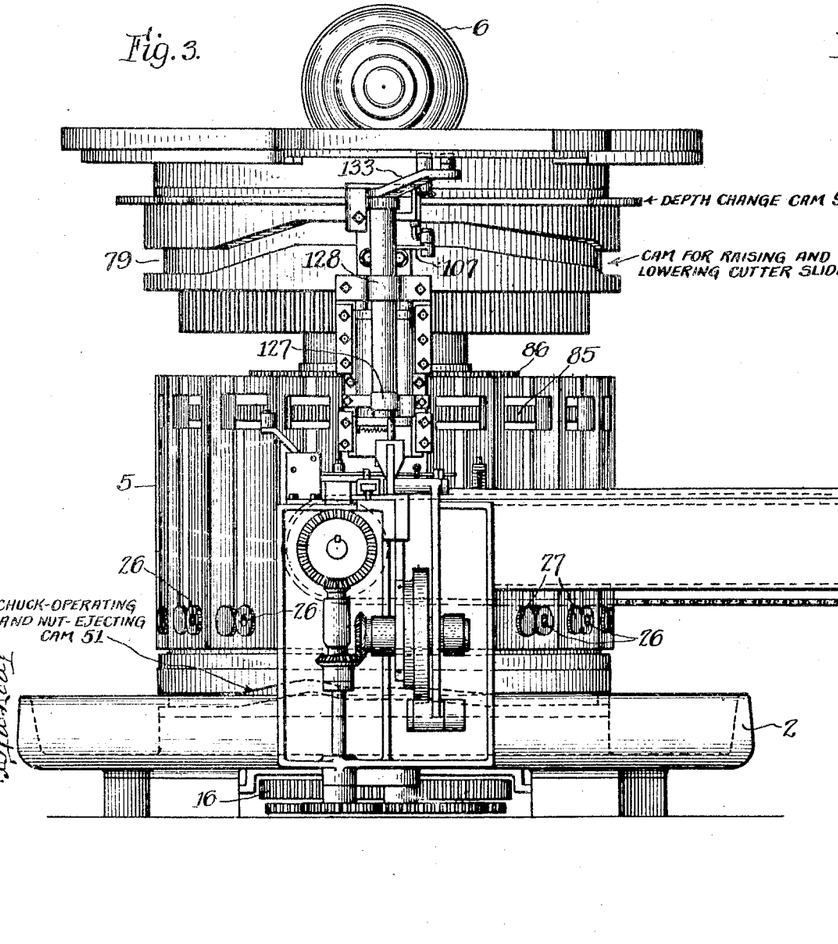
Fig. 3 is a front elevation of a machine with all except one of the nut-milling units omitted.
Figure 7:
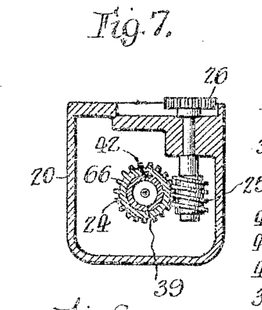
Fig. 7 is a section on line 7—7 of Fig. 9.

The means herein shown for revolving the work spindle comprises worm-wheel teeth 24 formed upon the lower portion of the spindle and meshing with a worm 25 (Fig. 7) which is rigid with a pinion 26. The latter meshes with a pinion 27 (Fig. 3) fixed upon the outer end of a shaft 28 (Fig. 6) which is journaled in the drum 5. To the inner end of the shaft 28 is fixed a bevel pinion 29 that meshes with a bevel gear ring 30 fixed to the base 1 in concentric relation to the drum 5. It will be seen that as the drum 5 revolves, power will be communicated through the gear train 30, 29, 27, 26, 25, 24 continuously to revolve the work spindle 21.

In the upper end of the work spindle is a hexagonal opening 31 (Fig. 10) to receive a nut blank A. The blank is supported in said opening by resilient means, which, in the present embodiment of the invention, comprises three equi-distant spring fingers 32 (Fig. 11) that project inwardly below the opening 31. The fingers 32 are attached to a tubular member 33 (Fig. 9) which is rigidly connected to the work spindle concentrically thereof.

In the embodiment herein shown of the invention, the means employed to grip the blank comprises three chuck jaws 34 (Figs. 12 and 13) arranged equi-distantly about the axis of the work spindle. Said jaws are mounted in guideways in the upper part of the work spindle to move toward and away from the blank. The means for thus moving the jaws comprises levers 35 (Fig. 9) which are supported on pivots 36 in the work spindle (see Figs. 9, 10, and 11). The upper arms of the levers 35 lie within openings 37 (Fig. 13) in the chuck jaws. The lower arms of said levers are arranged to enter channels 38 (Fig. 9) formed in the sides of a chuck-operating tube 39. The tube 39 is concentric with the work spindle 21 and is mounted in bearings 40 and 41 in said spindle for vertical sliding movement. The tube 39 is caused to revolve with the work spindle by means of a spline 42 (Figs. 7 and 9) attached to the work spindle and fitting within the splineway 43 in the tube.

Attached to the upper portion of the tube 39 is a collar 44 having recesses 44ª which form part of the channels 38. When the parts are in the position shown in Fig. 9, the levers 35 are held in position to clamp the blank. When the tube 39 is raised, the beveled surface 45 is moved above the lower ends of the levers, thus allowing the lower ends of the levers to swing inwardly. In the continuing upward movement of the tube 39, the recesses 44ª in the collar 44 engage the inclined surfaces 47 of the levers 35 and thus positively swing said levers in the direction to withdraw the jaws 34 from the blank.

Figures 5, 6:
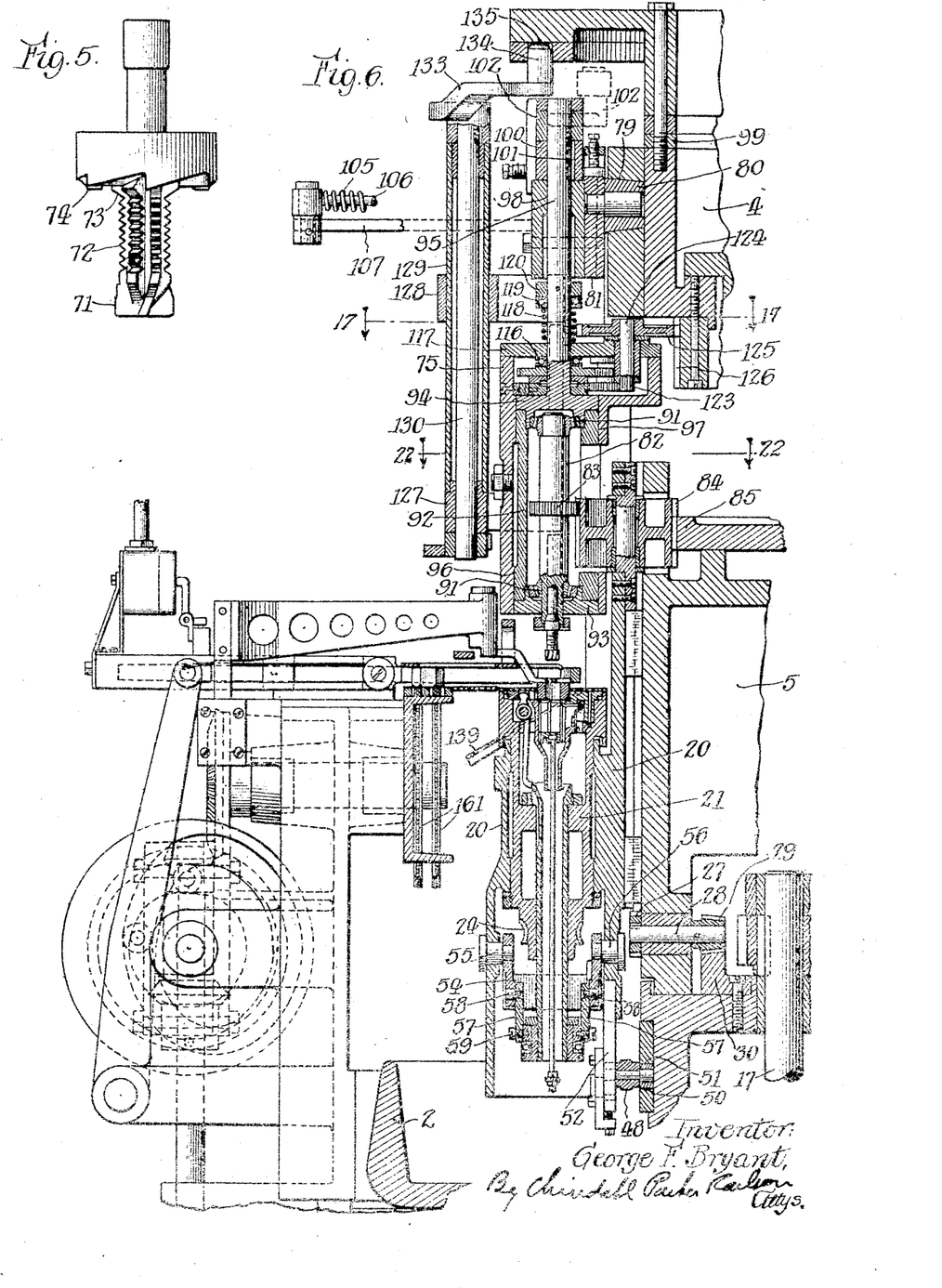
Fig. 5 is a detail view of the cutter.
Fig. 6 is a view similar to the left-hand portion of Fig. 1, but on a larger scale.
Figure 8:
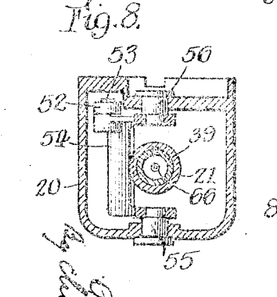
Fig. 8 is a section on line 8—8 of Fig. 9.
Figure 9:
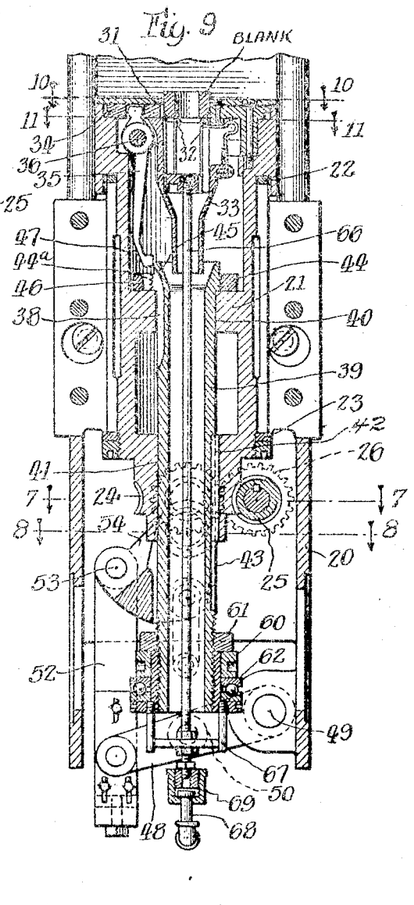
Fig. 9 is a vertical sectional view of one of the work spindles.
Figures 10, 11, 12, 13:
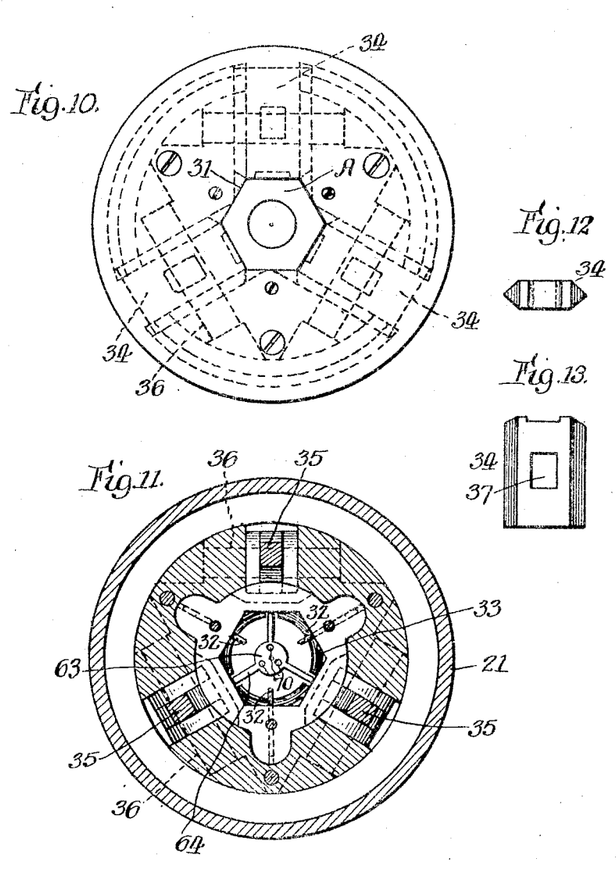
Fig. 10 is a plan view taken in the plane of line 10—10 of Fig. 9.
Fig. 11 is a section on line 11—11 of Fig. 9.
Fig. 12 is an end view of one of the chuck jaws.
Fig. 13 is a plan view of one of the jaws.

The means herein shown for raising and lowering the chuck-operating tube 39 comprises an arm 48 (Fig. 9) pivoted at 49 to the bracket 20. On the arm 48 is a roller 50 that travels within the groove of a cam 51 that encircles the base 1. To the arm 48 is pivoted a link 52 which is pivoted at 53 to a toggle lever 54 (Figs. 6, 8 and 9). The lever 54 is pivoted to the bracket 20 at 55 and 56 (Fig. 8). Two links 57 (Fig. 6) are pivoted to the toggle lever 54 at 58 and are also pivoted at 59 to a collar or yoke 60 (Fig. 9) which rotatably encircles the lower portion of the chuck-operating tube 39. The yoke 60 lies between a collar 61 and a thrust bearing 62 on the tube 39. It will be seen that as the drum 5 revolves, the arm 48 will be swung to raise and lower the tube 39, and thus actuate the chuck. When the points 56, 58 and 59 are in alinement (as in Figs. 6 and 9), the chuck is locked in closed position.

Means is provided for ejecting the completed nut. The form of ejecting means herein shown comprises a head 63 (Fig. 11) which has wings 64 lying within vertical guideways 65 formed in the tubular member 33. The head 63 is secured to a tube 66 (Fig. 9) which extends axially of the work spindle and is attached near its lower end to a crosshead 67 that is rigidly attached to the lower end of the chuck-operating tube 39. It will be seen that the ejector 63 is arranged to move up and down with the tube 39, the upward stroke of the ejector being sufficient to lift the finished nut so that the chamfered lower side of the nut is slightly above the top of the work spindle.

Any suitable means may be provided for supplying coolant to the cutter and the work.

In the present instance, I have shown a coolant supplying tube 68 (Fig. 9) which is arranged to revolve with the drum 5, said tube being connected by means of a stuffing box 69 to the lower end of the tube 66. The head 63 is chambered to communicate with the tube 66 and has a suitable number of openings 70 (Fig. 11) through which coolant is discharged upwardly into the nut. The chips and coolant flow downwardly within the tubular member 33, past the ejector head 63, down through the lower portion of the tube 33, and thence down through the tube 39, from whence the coolant flows into the trough 2. The tube 39 is of sufficient internal diameter to pass up around the lower portion of the tube 33. The construction just described for supplying coolant and carrying away the coolant and chips keeps the coolant and chips away from the guides for the chuck jaws and the mechanism for operating the jaws. The yieldable members for supporting the blank being in the nature of springs and therefore requiring no pivots, are not harmed by the coolant or chips.

The cutter is illustrated in Fig. 5. It comprises a portion 71 adapted to drill or ream the hole punched in the blank, a portion 72 comprising annular series of non-spiral cutting teeth for milling threads in the blank, a portion 73 for milling a countersink at the entrance to the bore of the nut, and a face mill 74 for milling the contact end of the nut.

Figure 4:
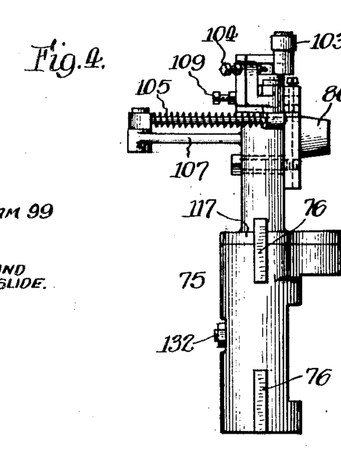
Fig. 4 is a detail view of the cutter slide.
Figure 22:
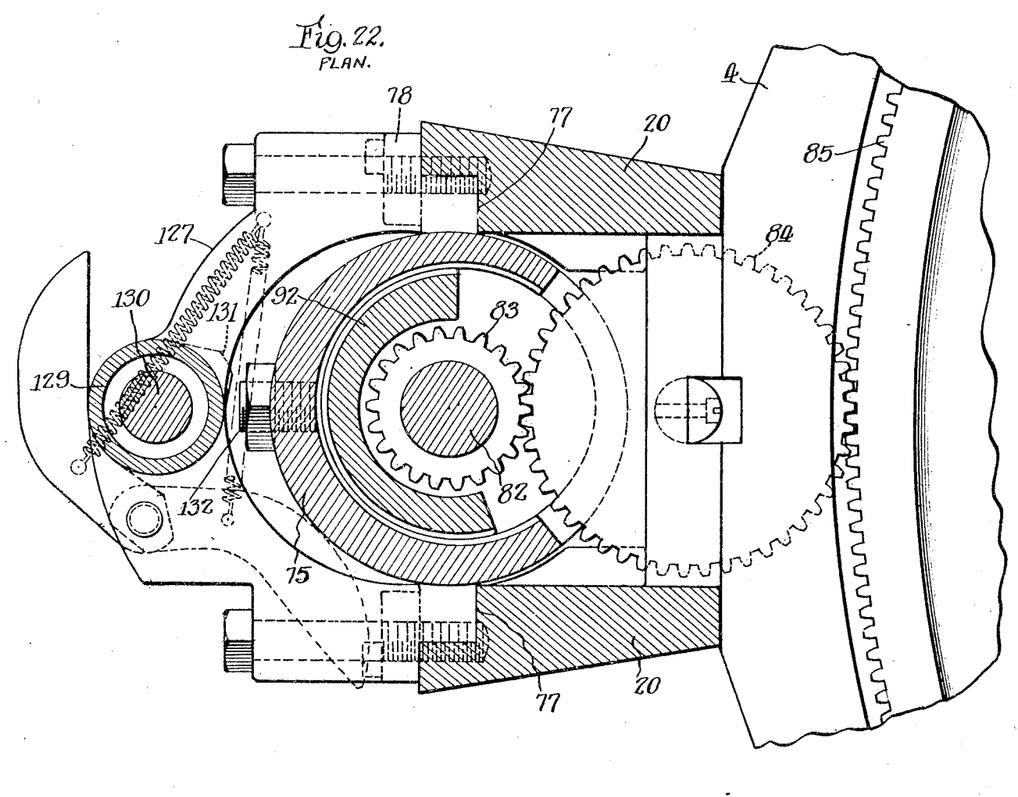
Fig. 22 is a section on line 22—22 of Fig. 6.

The cutter is carried by a slide 75 which is shown in detail in Fig. 4. On opposite sides of the slide 75 are ribs 76 which slide in guideways provided on the bracket 20. These guideways are formed between the surfaces 77 (Figs. 19 and 22) on the bracket 20 and gibs 78 secured to said bracket.

The means for reciprocating the cutter slide comprises a cam groove 79 (Figs. 3 and 6) extending around the drum 4. On the rear or inner side of the cutter slide 75 is a roller 80 adapted to run in the cam groove 79. As indicated in Fig. 6, the plate 81 that carries the roller 80 is connected to the cutter slide 75 for adjustment up and down in order that the cutter may be accurately adjusted with relation to the blank.

The cutter is secured to the lower end of a spindle 82. Rigid with the spindle 82 is a pinion 83 that meshes with an intermediate pinion 84 carried by the bracket 20. The pinion 84 in turn meshes with a spur gear 85 which is rotatably mounted on the column 3 (Fig. 1). Fixed to the spur gear 85 is a smaller spur gear 86 which meshes with a pinion 87 fixed to the lower end of a shaft 88 which is supported in bearings on the stationary drum 4. On the upper end of the shaft 88 is a bevel pinion 89 that meshes with a bevel pinion 90 on the shaft 11. The intermediate gear 84 is wide enough to allow the pinion 83 to remain in mesh during the reciprocation of the cutter slide.

While the blank is being drilled, countersunk and faced, the cutter is concentric with the blank. To effect the milling of the threads, the cutter must be moved laterally to the extent required by the depth of the threads. In order that the cutter may be moved from concentric position to the eccentric position required for thread milling and back again, the spindle 82 is mounted in bearings 91 (Fig. 6) contained in a structure which is rotatably mounted in the cutter slide. The structure referred to comprises a sleeve-like member 92, a lower bearing cap 93, an upper bearing cap 94, and a shaft 95, all rigidly secured together. The sleeve 92 and the caps 93 and 94 are mounted for rotational movement in bearings 96 and 97 in the cutter slide 75. The shaft 95 has a bearing at 98 in the upper portion of the cutter slide.

Figures 14, 15:
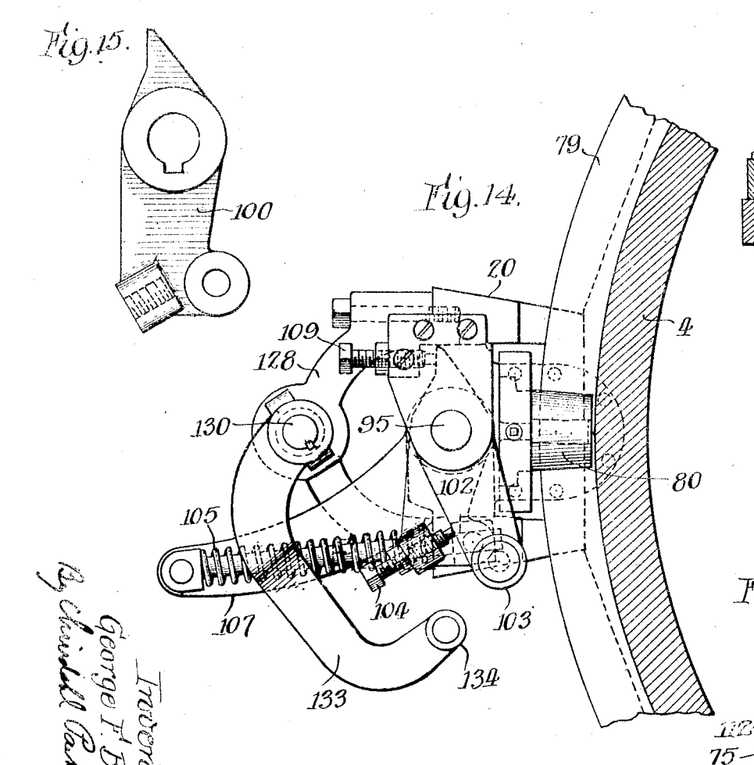
Fig. 14 is a plan view of one of the thread milling units.
Fig. 15 is a detail view of one of the levers comprised in the depth-change mechanism.
Figures 16, 17, 18:
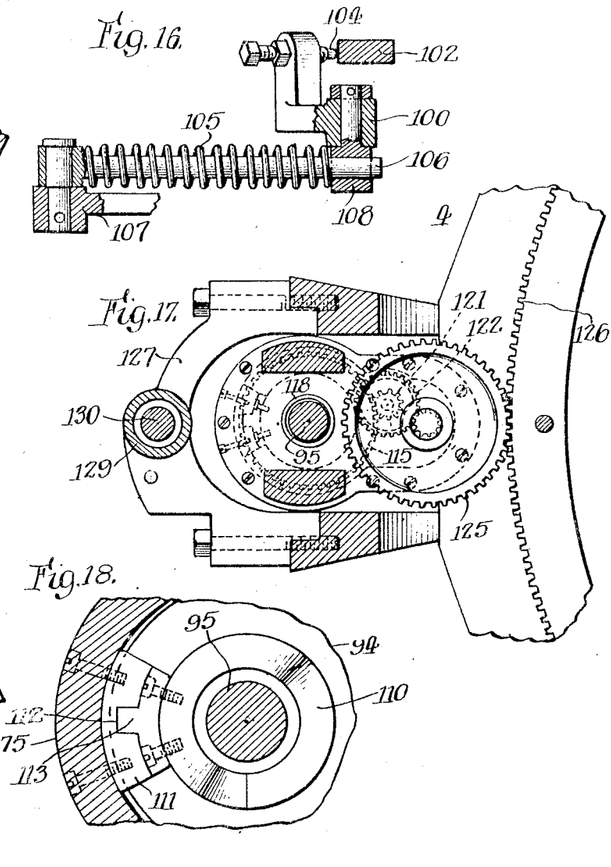
Fig. 16 is a fragmental view of said mechanism.
Fig. 17 is a view taken in the plane of line 17—17 of Fig. 6.
Fig. 18 is a fragmental section on line 18—18 of Fig. 2.

It will be noted upon comparison of the axis of the cutter spindle 82 with the axis of the shaft 95 in Fig. 6, that the cutter spindle is eccentrically mounted in the sleeve 92, and that the cutter may be moved into and out of concentric position with respect to the blank by turning said sleeve. This is effected by means of a cam 99 fixed to the stationary drum 4 and operating on an arm attached to the upper end of the shaft 95. Said arm is not rigidly connected to the shaft 95, but is arranged as indicated in Figs. 15 and 15ᵃ. An arm 100 is splined to the shaft 95, as indicated at 101 in Fig. 6, so as to allow the shaft 95 to move up and down a slight distance for a purpose to appear hereinafter. An arm 102 is loosely mounted on the shaft 95 and carries a roller 103 adapted to run on the depth-change cam 99. On the arm 100 is a stop screw 104 arranged to bear against the arm 102. The means for moving the arm 100 in the direction to press the stop 104 against the arm 102 and thus hold the roller 103 against the cam 99 comprises a coiled expansive spring 105 which surrounds a rod 106 that is pivoted at one end to a bracket 107 (Figs. 4 and 14) on the upper end of the cutter slide. The other end of the rod 106 slides freely through a stud 108 (Fig. 16) which is pivoted on the arm 100. The spring 105 bears at one end against a shoulder on the rod 106 and at its other end against the stud 108, and thereby forces the arm 102 toward the depth-change cam 99.

At that portion of the orbit of the milling unit where the cutter is to occupy a position concentric with the blank, the depth-change cam 99 has a recess sufficiently deep so as to allow the spring 105 to press the arm 100 against a stop screw 109 (Fig. 14) in the cutter slide. Contact of the arm 100 with the stop 109 holds the cutter in concentric relation to the blank. When the drilling, countersinking and facing operations have been completed, the cam 99 engages the roller 103 and forces the arm 100 (and hence the shaft 95) to turn against the pressure of the spring 105 so as to carry the thread-milling portion 72 of the cutter into position to cut threads in the nut. The teeth of the gears 83 and 84 are of such form as to remain in mesh in all positions of the sleeve-like structure 92.

In order to move the cutter longitudinally as required by the lead of the threads being cut, I provide the following described means. A cam ring 110 (Fig. 2) is mounted on the cap 94 concentric with the shaft 95. To hold the cam ring 110 against turning, I provide a block 111 (Fig. 18) which is fixed to the cutter slide 75 and has a groove 112 to receive a tongue 113 fixed to the cam ring. The tongue and groove connection permits the cam ring 110 to move up and down with the spindle-containing structure 92, 93, 94, 95. Above the cam ring 110 is a cam 114 (Fig. 2) which is rigid with a pinion 115 rotatably mounted on the shaft 95. A thrust bearing 116 (Fig. 6) is interposed between the pinion 115 and the part 117 of the cutter slide 75. A coiled expansive spring 118 surrounding the shaft 95 bears at its lower end against the part 117 and at its other end against a thrust bearing 119 which lies against a collar 120 fixed on the shaft 95. The spring 118 holds the lead cam ring against the lead cam 114.

The means for turning the lead cam 114 to move the cutter-spindle-containing structure downwardly as the cutting of the threads progresses, comprises a pinion 121 (Fig. 17) rotatably mounted on the lower side of the part 117. Rigid with the pinion 121 is a pinion 122 that meshes with a pinion 123 (Fig. 6) on the lower end of a shaft 124. Fixed on the upper end of the shaft 124 is a pinion 125 that meshes with a gear ring 126 fixed to the stationary drum 4. The gear ring 126 is of sufficient width to remain in mesh with the pinion 125 during the reciprocation of the cutter slide 75. As the drum 5 revolves, the lead cam 114 is rotated to move the cutter down positively and accurately in accordance with the lead of the threads to be milled. The lead cams 110 and 114 are of such form that when the milling of the threads has been completed and the cutter has been moved out of the threads, the spring 118 is allowed to raise the cutter with reference to the cutter slide into the initial thread-milling position.

It is essential to the accurate milling of the threads that the cutter slide 75 be held firmly against any movement with relation to the drum 5. In order to take up any play of the guide ribs 76 (Fig. 4) in their guideways, I provide the means to be now described.

Two brackets 127 and 128 (Figs. 3, 6, 14, 17 and 22) are rigidly attached to the bracket 20 and extend across the front of the cutter slide 75. The brackets 127 and 128 carry a vertical tube 129. A rock shaft 130 is journaled in a bearing in the bracket 127 and a bearing in the upper end of the tube 129. Fixed to the lower end of the rock shaft 130 is a cam 131 (Fig. 22) adapted to bear against a stop screw 132 in the forward side of the cutter slide. To the upper end of the rock shaft 130 is fixed a crank arm 133 (Figs. 3 and 6) carrying a roller 134 which runs within a grooved cam 135 fixed to the stationary drum 4. At the proper point in the rotation of the drum 5, the arm 133 is swung outwardly so as to force the cam 131 against the stop screw 132, thereby forcing the cutter slide 75 rearwardly and thus holding the guide ribs 76 firmly against the surfaces 77 on the housing 20.

Figure 23:
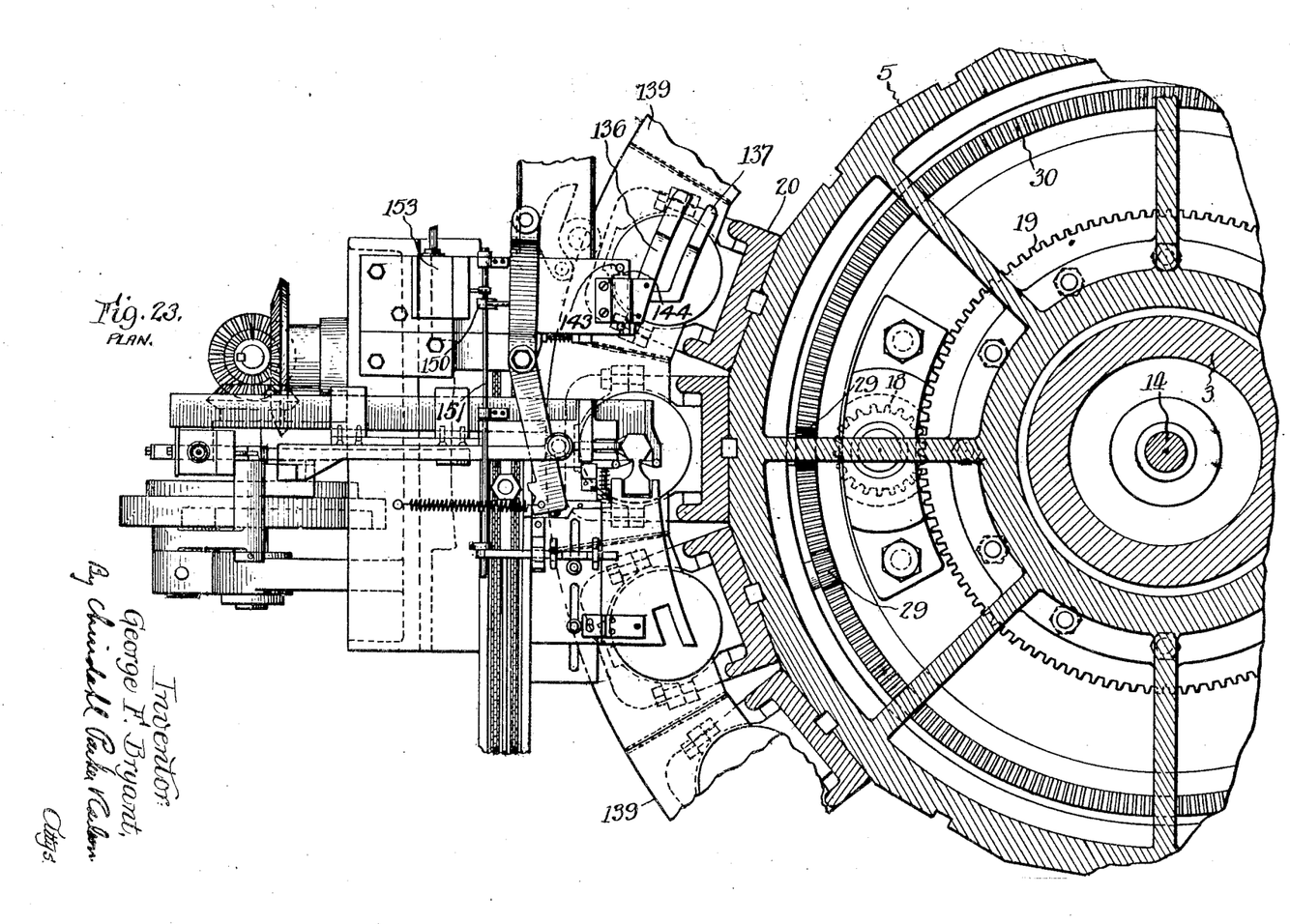
Fig. 23 is a horizontal sectional view.
Figure 26:
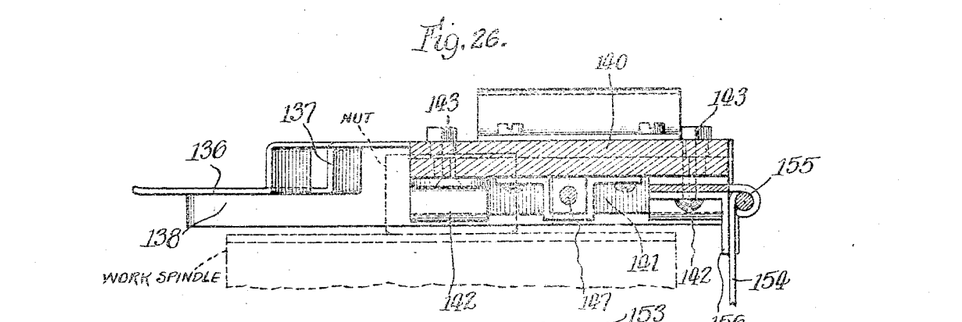
Fig. 26 is a view taken approximately in the plane of line 26—26 of Fig. 24.
Figure 27:
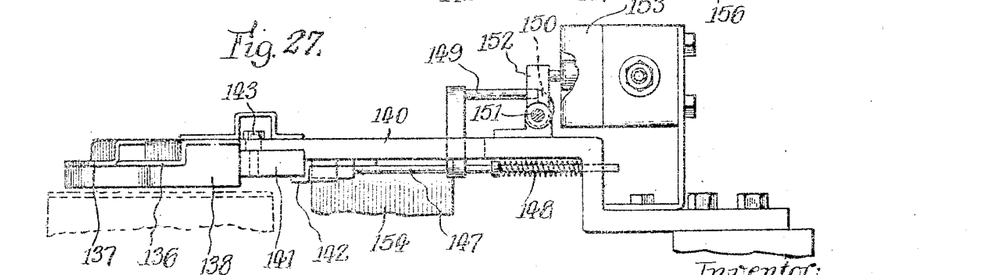
Fig. 27 is a view taken in the plane indicated by dotted line 27—27 in Fig. 24.

At the point where the completed nut is ejected from the chuck, I provide a guard comprising two fingers 136 and 137 (Fig. 23) located directly above the orbit of the chucks. The free ends of the guard fingers lie just far enough above the plane of the chucks to clear the nuts. Said fingers have bent-up portions above the point where the nut is ejected by the ejector 63 (see Fig. 26). Fixed to the guard finger 137 is a flange 138 (Figs. 25, 26 and 27) against which the ejected nut is carried in the rotation of the drum 5. The wall 138 serves to detain the nut as the chuck from which it was ejected continues its travel. When the work spindle has moved out from under the nut, the latter slides down a sheet-metal skirt 139 attached to the milling units and drops into a suitable receptacle (not shown).

Figure 24:
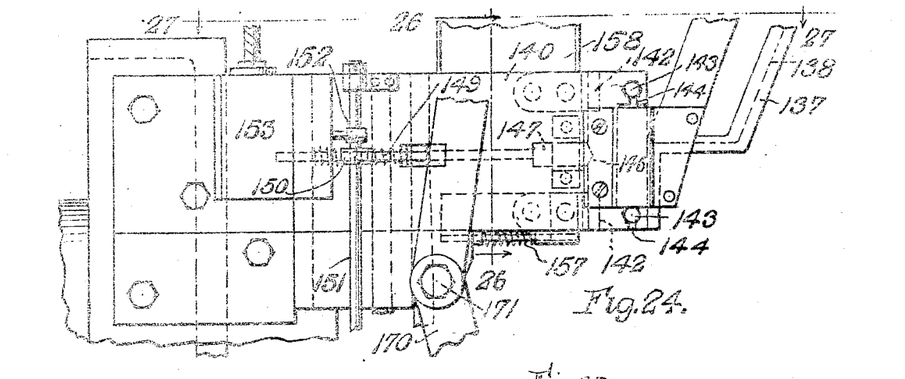
Fig. 24 is a fragmental plan view.

The finger 136 is rigidly attached to a supporting bracket 140, but the finger 137 is yieldingly mounted so that in case the nut is not freed from the work spindle and is forced against the flange 138, the finger 137 may yield and thus operate a stop mechanism. The finger 137 is secured to a block 141 (Figs. 26 and 27) which is slidably supported beneath the bracket 140 by means of two guide flanges 142 attached to said bracket and two screws 143 (Fig. 24) engaging said block. The screws 143 extend loosely through slots 144 in the bracket 140, said slots being open at one end. In one side of the block 141 is a V-shaped notch 146 (Fig. 24) to receive the head of a plunger 147. A spring 148 normally holds the plunger in the notch 146. If, however, a nut is forced hard against the flange 138, said flange, the finger 137 and the block 141 will yield (toward the bottom of the view as seen in Fig. 24), thereby forcing the plunger 147 out of the notch 146. The movement of the plunger is utilized to open the motor circuit, there being a pin 149 (Fig. 27) on said plunger in position to engage a lug 150 fixed on a rock shaft 151. The shaft 151 carries an arm 152 which is arranged to open a switch 153 included in the motor circuit.

Figure 25:
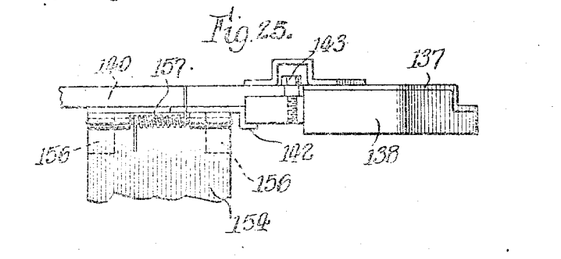
Fig. 25 illustrates certain parts associated with the unloading means.

Close to the path of travel of the work spindles is a gate 154 (Figs. 25, 26 and 27) which is hinged at 155 and is normally held against stops 156 by a spring 157 (Figs. 24 and 25). Any nuts which are thrown against the gate 154 slide down a chute 158 (Fig. 24) into a receptacle (not shown).

The space between the fingers 136 and 137 provides clearance for the cutter, as the latter has not completed its ascent at the time the unit reaches said fingers.

The means for loading the chucks may be of any preferred character, and the means for supplying blanks to the loading means likewise may be of any desired construction.

Summarizing the operation of the machine, and referring particularly to Fig. 28, it may be stated that the work spindle makes two revolutions in each revolution of the drum 5. A blank is inserted in the chuck at the point marked 0°. At about 10° the cutter slide 75 begins to descend through the action of the cam 79. At 25° the cutter slide has descended far enough to bring the drill portion 71 (Fig. 5) of the cutter into engagement with the blank, the chuck having previously gripped the blank. At about 65° the drilling is completed. The cutter slide continues its descent, bringing the countersinking portion 73 and the face mill 74 of the cutter into engagement with the blank, the countersinking and facing being completed at about 95°, whereupon the cutter slide 75 begins to rise to place the countersinking portion 73 above the upper face of the blank. In the next two and one half degrees of movement the cutter slide has risen so that the countersinking portion 73 is clear of the blank. At this time the depth-change cam 99 begins to turn the shaft 95 to bring the thread-milling portion 72 of the cutter into engagement with the bore of the blank. Before the thread-milling portion 72 begins to mill the threads, the cam 131 (Fig. 22) has acted to clamp the cutter slide 75 rigidly against the guide surfaces 77. As the cutter is rotated to mill the threads the cutter-spindle-containing structure is moved downwardly by the lead cams 110, 114 (Fig. 2), as required by the lead of the threads being cut. At 122° 30' the thread-milling portion 72 has reached its full depth in the blank. During the next 180° of revolution of the drum 5, the blank makes one revolution and the milling of the threads is completed, after which the depth-change cam 99 begins to move the cutter into concentric relation to the blank and the cam 131 begins to unlock the cutter slide. When the cutter is clear of the threads the lead cams 110, 114 permit the spring 118 to raise the cutter-spindle-containing structure with relation to the cutter slide 75. At 315° the depth-change cam 99 and the spring 105 have returned the cutter to concentric relation to the nut, the cutter slide 75 has been unlocked, and said slide begins to rise under the action of the cam 79. At 327° the chuck starts to open and is fully open at about 332°. At 340° the cutter slide has completed its ascent and the nut has been ejected under the bent-up portions of the guard fingers 136, 137. The ejected nut is swept off the work spindle by the flange 138 and slides down the skirt 139 into a receptacle (not shown).

Where specific points in the rotation of the drum have been mentioned in the foregoing summary of the operation, it will be understood that some variation is permissible.

It will be seen that the machine herein disclosed comprises a traveling series of units each of which is complete in itself and operates independently of the others to perform various operations upon a nut blank, namely, boring, countersinking, facing and threading. It will further be noted that all these milling operations are performed with but one chucking of the work, thus eliminating the variations which are inevitable in successive chuckings. The mechanisms of the unit are timed to complete the several operations in the brief period of time consumed in moving from the loading to the unloading station.

While the present embodiment of the invention comprises eighteen units, it will be understood that the number may be varied as desired, and that numerous other changes may be made without departing from the spirit and scope of the invention as defined in the appended claims.

I claim as my invention:

1. A metal-working machine comprising a circular base, a central column on the base, a drum rotatably mounted on the column, a plurality of metal-working mechanisms mounted on the perimeter of said drum, each of said mechanisms comprising a rotatable work spindle, a cutter slide and a rotatable cutter spindle on the slide, the axes of which spindles extend in the same direction, each work spindle comprising a chuck, an ejector, and means for operating the ejector and the chuck, a cam encircling said base for actuating the chuck and ejector operating means, a stationary circular cam above said drum for successively reciprocating the cutter slides, the cutter spindle of each unit being mounted for lateral movement with respect to the cutter slide, a stationary cam arranged above said drum, means carried by each unit for actuation by the last-mentioned cam for laterally moving the cutter spindle, a stationary cam arranged above said drum, and means carried by each unit for engagement by the last-mentioned cam for locking the cutter slide against movement in relation to the drum.

2. A metal-working machine comprising a base, a central column on the base, a drum rotatably mounted on the column, a plurality of metal-working mechanisms mounted on the perimeter of said drum, each of said mechanisms comprising a rotatable work spindle and a rotatable cutter spindle, the axes of which extend in the same direction, each work spindle comprising a chuck, an ejector and means for operating the ejector and the chuck, a cam encircling said base for actuating the chuck and ejector operating means, a stationary circular cam above said drum for successively reciprocating the cutter spindles, the cutter spindle of each unit being mounted for lateral movement with respect to the unit, a stationary cam arranged above said drum, and means carried by each unit for actuation by the last-mentioned cam for laterally moving the cutter spindles.

3. A metal-working machine comprising a base, a central column on the base, a drum rotatably mounted on the column, a plurality of metal-working mechanisms mounted on the perimeter of said drum, each of said mechanisms comprising a chuck, a cutter slide and a rotatable cutter spindle on the slide, automatic means for successively opening and closing the chucks in the rotation of the drum, a stationary circular cam above said drum for successively reciprocating the cutter slides, the cutter spindle of each unit being mounted for lateral movement with respect to the slide, a stationary cam arranged above said drum, means carried by each unit for actuation by the last-mentioned cam for laterally moving the cutter spindle, a stationary cam arranged above said drum, and means carried by each unit for engagement by the last-mentioned cam for locking the cutter slide against movement in relation to the drum.

4. A metal-working machine comprising a base, a central column on the base, a drum rotatably mounted on the column, a plurality of metal-working mechanisms mounted on the perimeter of said drum, each of said mechanisms comprising a chuck and a rotatable cutter spindle, automatic means for successively opening and closing the chucks in the rotation of the drum, a stationary circular cam above said drum for successively reciprocating the cutter spindles, the cutter spindle of each unit being mounted for lateral movement with respect to the unit, a stationary cam arranged above said drum, and means carried by each unit for actuation by the last-mentioned cam for laterally moving the cutter spindle.

5. A nut-milling mechanism having, in combination, blank-supporting means, a cutter slide, a structure mounted in said slide for rotational movement about an axis extending in the direction of movement of the cutter slide, a cutter spindle mounted in said structure for rotation upon an axis eccentric to the axis of rotational movement of said structure, a thread mill connected to said spindle, means for reciprocating the slide to carry the thread mill into and out of the blank, means for turning the spindle-containing structure to carry the thread mill laterally into engagement with the blank, means for moving the spindle-containing structure longitudinally with respect to the cutter slide in accordance with the lead of the threads being cut, guide means for the cutter slide, and means for locking the cutter slide rigidly to said guide means during the milling of the threads.

6. A nut-milling mechanism having, in combination, blank-supporting means, a cutter slide, a structure mounted in said slide for rotational movement about an axis extending in the direction of movement of the cutter slide, a cutter spindle mounted in said structure for rotation upon an axis eccentric to the axis of rotational movement of said structure, a thread mill connected to said spindle, means for reciprocating the slide to carry the thread mill into and out of the blank, means for turning the spindle-containing structure to carry the thread mill laterally into engagement with the blank, and means for moving the spindle-containing structure longitudinally with respect to the cutter slide in accordance with the lead of the threads being cut.

7. A nut-milling mechanism having, in combination, blank-supporting means, a cutter slide, a structure mounted in said slide for rotational movement about an axis extending in the direction of movement of the cutter slide, a cutter spindle mounted in said structure for rotation upon an axis eccentric to the axis of rotational movement of said structure, a thread mill connected to said spindle, means for reciprocating the slide to carry the thread mill into and out of the blank, means for turning the spindle-containing structure to carry the thread mill laterally into engagement with the blank, and means for causing relative longitudinal movement of the thread mill and the blank in accordance with the lead of the threads being cut.

8. A nut-milling mechanism having, in combination, blank-supporting means, a cutter spindle, a structure in which said spindle is journaled, said structure being mounted for rotational movement about an axis eccentric to the axis of the cutter spindle, a thread mill connected to said spindle, means for causing relative movement between the blank and the thread mill to carry the thread mill into and out of the blank, means for turning the spindle-containing structure to carry the thread mill laterally into engagement with the blank, and means for causing relative longitudinal movement between the thread mill and the blank, in accordance with the lead of the threads being cut.

9. A nut-milling mechanism comprising a rotatable work spindle, a cutter slide, a cutter spindle on the slide, a thread mill carried by the cutter spindle, means for moving the cutter slide to insert the thread mill into the blank and to withdraw it therefrom, means for causing relative lateral movement of the thread mill and the blank to bring the thread mill into engagement with the bore of the blank, said last-mentioned means comprising a shaft which is eccentric to the cutter spindle and a cam for turning said shaft, and means including a lead cam concentric with said shaft for moving the cutter spindle longitudinally with respect to the cutter slide while the thread mill is operating, in accordance with the lead of the threads being cut.

10. A nut-milling mechanism having, in combination, blank-supporting means, a cutter slide, a structure mounted in said slide for rotational movement about an axis extending in the direction of movement of the cutter slide, a cutter spindle mounted in said structure for rotation upon an axis eccentric to the axis of rotational movement of said structure, said structure comprising a rock shaft concentric with said cutter slide, an arm connected to said rock shaft, and a cam engaging said arm for rocking said structure.

11. A nut-milling mechanism having, in combination, a rotatable work spindle, a rotatable cutter spindle, the axes of rotation of said spindles extending in the same direction, a cutter on said spindle comprising a drill, a thread mill, a countersinking cutter and a face mill arranged in the order stated, means for reciprocating the cutter into and out of a blank held by the work spindle, said last-mentioned means being arranged to pause after withdrawing the countersinking portion from the blank and before withdrawing the thread mill from the blank, means for moving the cutter spindle laterally while the spindle-reciprocating means is pausing in the position stated to carry the thread mill into engagement with the bore of the blank, and means for causing relative movement between the blank and the cutter longitudinally of the blank during the operation of the thread mill in accordance with the lead of the threads being cut.

12. A nut-milling mechanism having, in combination, a rotatable work spindle, a rotatable cutter spindle, the axes of rotation of said spindles extending in the same direction, a cutter on said spindle comprising a drill and a thread mill, means for reciprocating the cutter into and out of a blank held by the work spindle, said last-mentioned means being arranged to pause after the drill has operated upon the blank, means for moving the cutter spindle laterally while the spindle-reciprocating means is pausing in the position stated to carry the thread mill into engagement with the bore of the blank, and means for causing relative movement between the blank and the cutter longitudinally of the blank during the operation of the thread mill in accordance with the lead of the threads being cut.

13. A nut-milling mechanism having, in combination, a rotatable work spindle, a rotatable cutter spindle, the axes of rotation of said spindles extending in the same direction, the cutter on said spindle comprising a drill, a thread mill and a countersinking cutter arranged in the order stated, automatic means for reciprocating the cutter into and out of the blank held by the work spindle, means for moving the cutter spindle laterally to carry the thread mill into engagement with the bore of the blank, and cam means independent of said automatic means for moving the cutter longitudinally of the blank during the operation of the thread mill in accordance with the lead of the threads being cut.

14. A nut-milling mechanism comprising a rotatable work spindle, a cutter slide, a rotatable cutter spindle on the slide, a thread mill carried by the cutter spindle, automatic means for moving the cutter slide to insert the thread mill into the blank and to withdraw it therefrom, means for causing relative lateral movement of the thread mill and the blank to bring the thread mill in engagement with the bore of the blank, and a rotary cam for moving the cutter spindle longitudinally with respect to the cutter slide while the thread mill is operating, in accordance with the lead of the threads being cut.

15. The combination of a series of nut-milling mechanisms, each having, in combination, a rotatable work spindle to hold a nut blank and a rotatable cutter spindle having a thread-milling cutter, the axes of rotation of said spindles extending in the same direction, means to cause the series of milling mechanisms to travel, and means automatically actuated in the travel of said mechanisms for successively operating each cutter spindle to advance the same into the nut blank, move the cutter spindle laterally to carry the cutter into engagement with the blank and withdraw the cutter from such engagement, and retract the cutter from the blank.

16. The combination of a series of unitary milling mechanisms, each comprising a chuck to hold a nut blank and an ejector to eject the nut, when finished, from the chuck, means to cause the series of mechanisms to travel, and means automatically actuated in the travel of said series for successively opening the chucks to release the nuts, actuating the ejectors, and closing the chucks.

In testimony whereof, I have hereunto affixed my signature.

GEORGE F. BRYANT.